(12) United States Patent  
Wang

(10) Patent No.: US 6,309,148 B1  
(45) Date of Patent: Oct. 30, 2001

(54) COLUMN POSITIONING DEVICE FOR A DRILL PRESS

(75) Inventor: Jack Wang, Taichung (TW)

(73) Assignee: Palmgren Industrial Corp., Ltd. (TW)

( * ) Notice: Subject to any disclaimer, the term of this patent is extended or adjusted under 35 U.S.C. 154(b) by 0 days.

(21) Appl. No.: 09/541,538

(22) Filed: Apr. 3, 2000

(51) Int. Cl.[7] ................................................. B23B 39/00
(52) U.S. Cl. .......................... 408/87; 408/99; 408/103; 408/111; 408/236
(58) Field of Search .................................. 408/87, 95, 99, 408/103, 108–112, 712, 236, 237

(56) References Cited

U.S. PATENT DOCUMENTS

| | | | |
|---|---|---|---|
| 2,269,727 | * 1/1942 | Mead | 408/103 |
| 3,185,470 | * 5/1965 | Zitner | 408/103 |
| 4,468,159 | * 8/1984 | Oster | 408/112 |
| 4,799,835 | * 1/1989 | Doi | 408/87 |
| 5,102,270 | * 4/1992 | Warren | 408/103 |
| 5,318,392 | * 6/1994 | Svetlik et al. | 408/103 |

* cited by examiner

Primary Examiner—Steven C. Bishop  
(74) Attorney, Agent, or Firm—Charles E. Baxley

(57) ABSTRACT

A column positioning device for a drill press includes a base having a post and a positioning pin respectively extending from a top of the base. The post is received in a hollow column on which a motor is connected. The column has two positioning passages so that the positioning pin is engaged one of the positioning passages. A frame is connected a side of the column and a pusher is connected to the frame. A rod extends from the pusher and a pressing member is movably mounted to the rod. When rotating the column 180 degrees about the post, the column is conveniently positioned by inserting the pin with the other positioning passage.

5 Claims, 5 Drawing Sheets

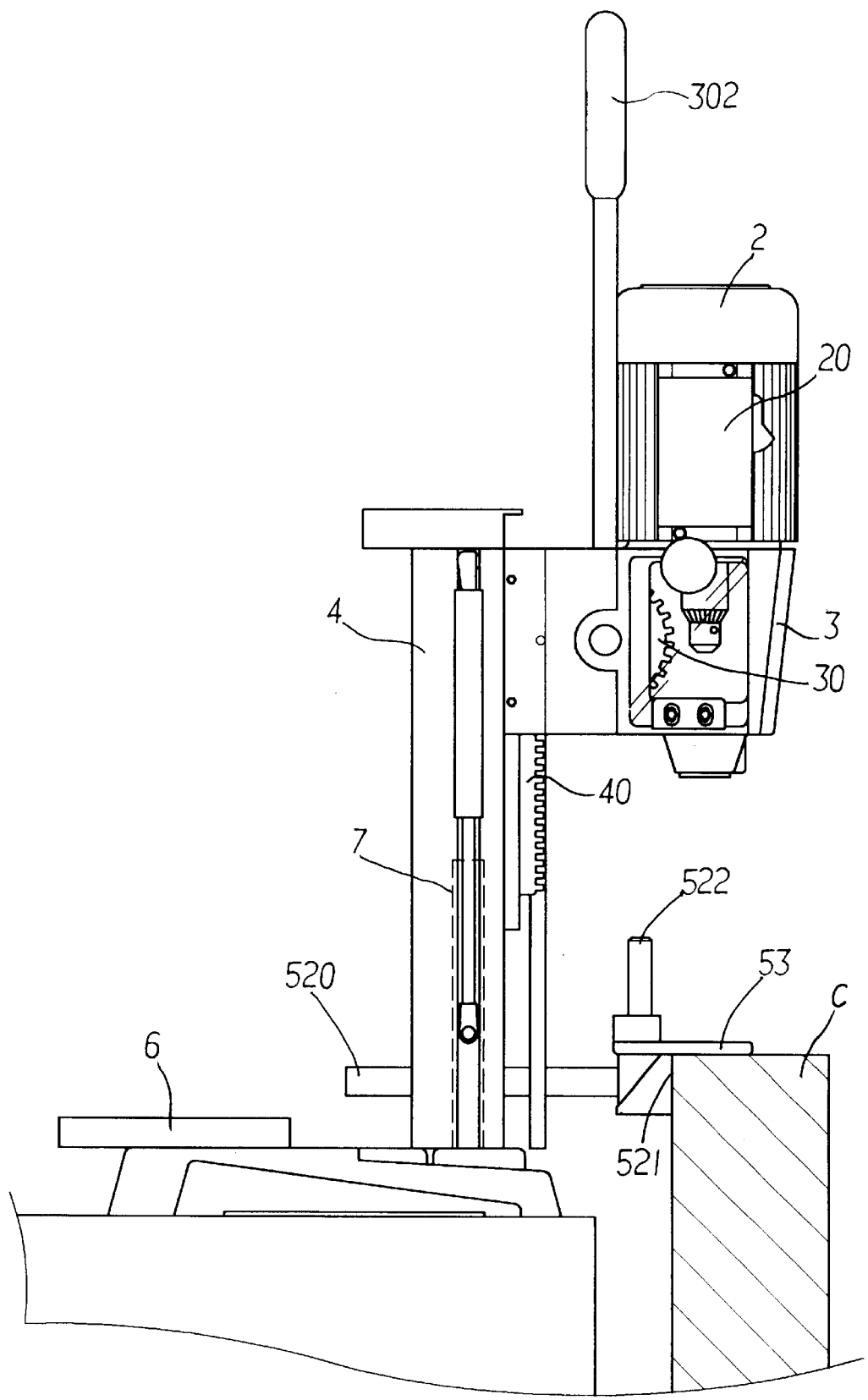
FIG·4

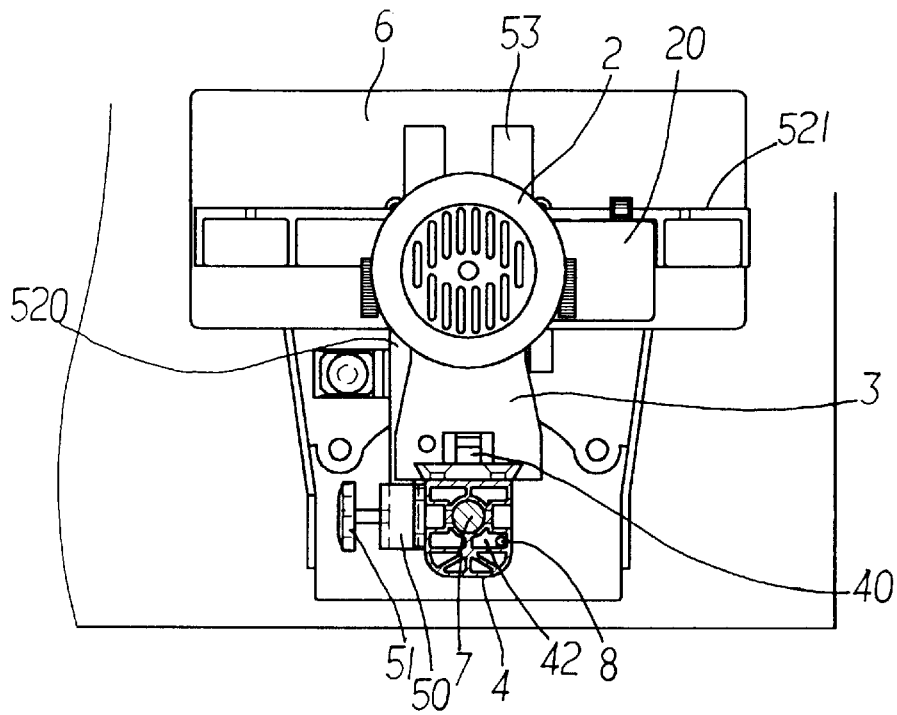
FIG·5
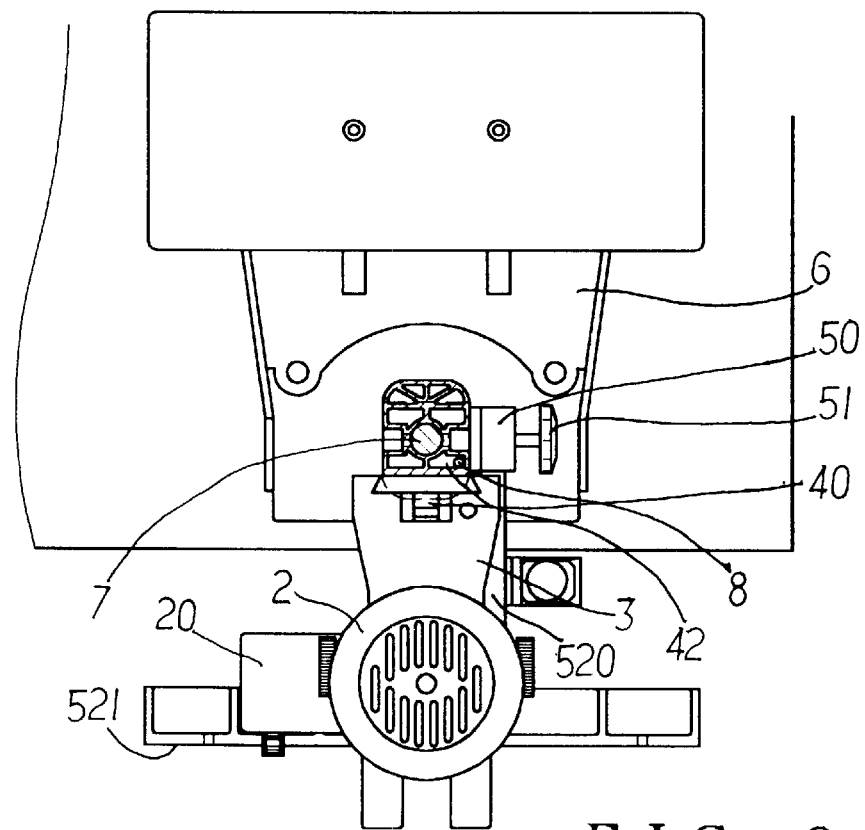
FIG·6

COLUMN POSITIONING DEVICE FOR A DRILL PRESS

FIELD OF THE INVENTION

The present invention relates to a column positioning device for a drill press. The device comprises a post received in a column of the machine and a positioning pin extends from a top of a base. The column can be rotated 180 degrees and positioned by inserting the positioning pin in a passage in the column.

BACKGROUND OF THE INVENTION

A conventional drill press generally includes a column connected to a base and a movable box is connected to the column. A motor is connected to the movable box and a chuck is connected to the motor so that the chuck is rotated at a high speed by the motor. A toothed rack is connected to the column and the movable box is movable on the rack by pulling a handle connected to the box. An object to be drilled is positioned on the base and pressed by a pressing member connected to the column. Nevertheless, when the object to be drilled is so tall that the chuck cannot be raised to a enough height, the operator will rotate the column together with the motor, the chuck and the pressing member 180 degrees so that the object can be placed on a lower surface other than the base. It is difficult to rotate the column on the base by one operator because the column is fixed on the base by at least four bolts and the center of weight of the column is too high because the motor.

The present invention intends to provide a column positioning device for a drill press wherein the column can be positioned by a pin inserting into one of two positioning passages in the column. When the column is rotated 180 degrees, the operator simply inserts the pin into the other positioning passage.

SUMMARY OF THE INVENTION

In accordance with one aspect of the present invention, a column positioning device for a drill press comprises a base with a post and a positioning pin respectively extending from a top of the base. A hollow column has a central passage for receiving the post, and two positioning passages defined longitudinally through the column. The positioning pin is engaged one of the positioning passages and a motor is movably connected to and along the column. A frame is connected a side of the column and a pusher is connected to the frame. A rod extends from the pusher and a pressing member is movably mounted to the rod.

The object of the present invention is to provide a column positioning device for a drill press, wherein the column can be rotated 180 degrees and is easily positioned by engaging a pin on the base with one of two positioning passages.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 4 is a side view to show yet another object is positioned between a pressing member and a base of the press drill;

FIG. 5 is a top view to show the position of the motor when the column is located at its general position, and FIG. 6 is a top view to show the position of the motor when the column is rotated 180 degrees about a post, and a pin on the base is engaged with one of two positioning passages in the column.

DETAILED DESCRIPTION OF THE PREFERRED EMBODIMENT

Figure 1:
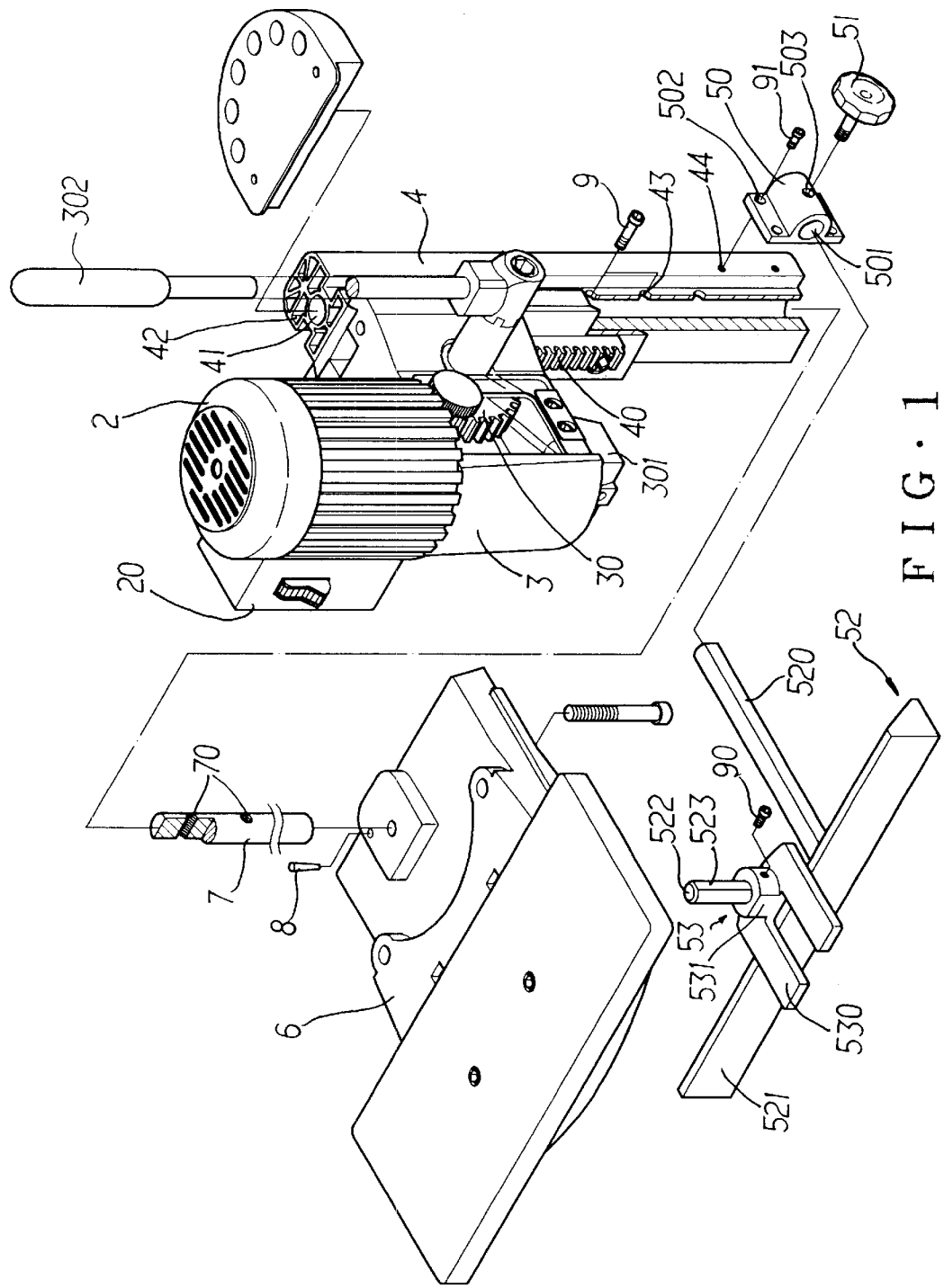
FIG. 1 is an exploded view to show a column positioning device for a press drill of the present invention.
Figure 2:
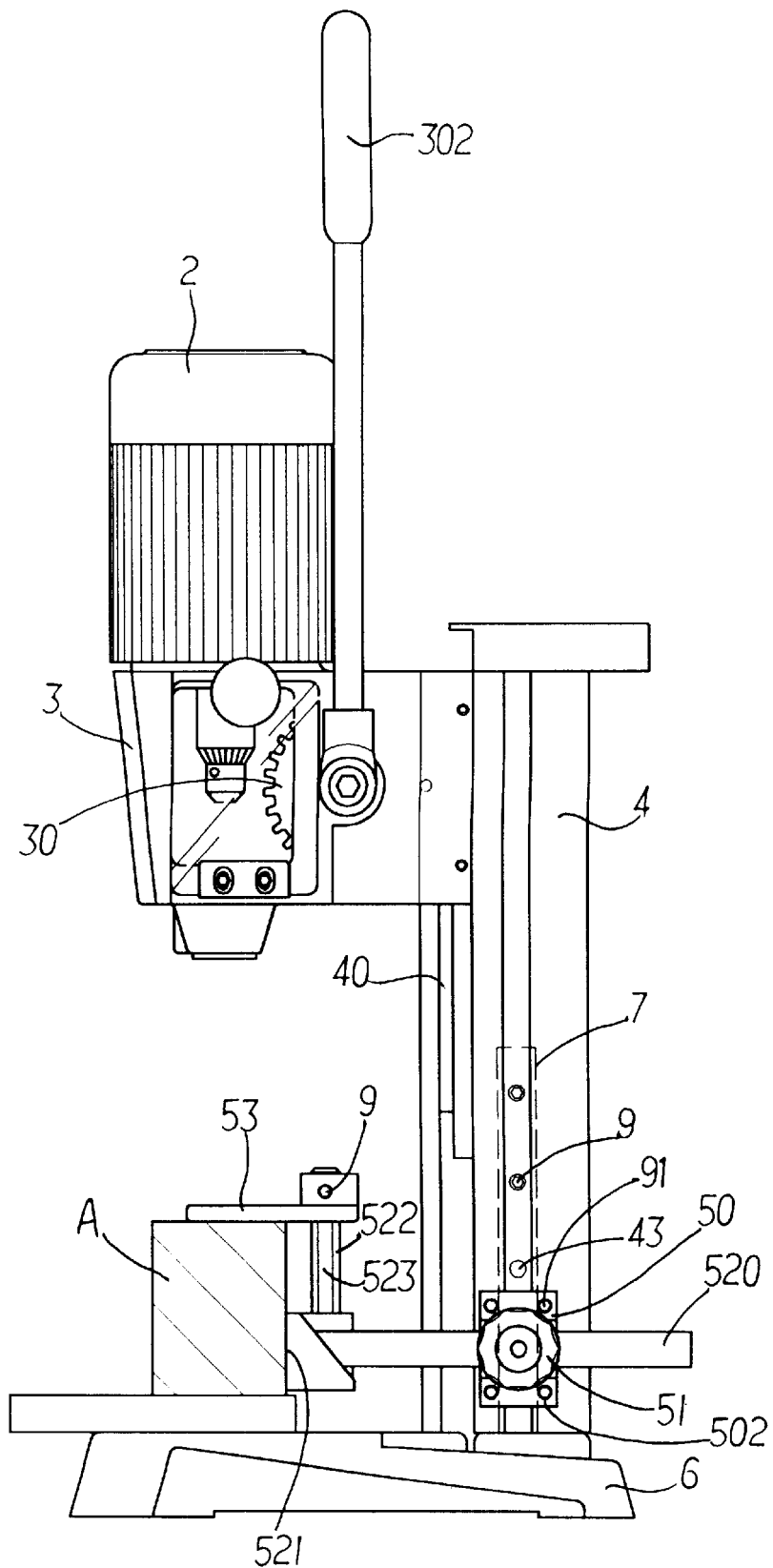
FIG. 2 is a side view to show an object is positioned between a pressing member and a base of the press drill.

Referring to FIGS. 1, 2 and 5, the column positioning device for a drill press in accordance with the present invention comprises a base 6 and a post 7 and a positioning pin 8 respectively extend from a top of the base 6. A plurality of first holes 70 are defined radially through the post 7. A hollow column 4 has a central passage 41 and two positioning passages 42 respectively defined longitudinally therethrough. The post 7 is received in the central passage 41 and the positioning pin 8 is engaged one of the positioning passages 42. A plurality of second holes 43 are defined through a side of the column 4 so that a positioning bolt 9 extends through one of the second holes 43 and is engaged with one of the second holes 70 to position the column 4 relative to the post 7.

A motor 2 is movably connected to and along the column 4 and a switch box 20 is connected beside the motor 2. A trunk portion 3 extends from the motor 2 and a gear 30 is rotatably received in the trunk portion 3. A toothed rack 40 is connected to the column 4 and the engaged with the gear 30. A chuck 301 is located at a bottom of the trunk portion 3 so as to connect a bit (not shown). When pulling a handle 302 on a side of the trunk portion 3, the gear 30 moves along the toothed rack 40 and the chuck 301 is lowered to drill a hole in an object as shown in FIG. 2.

A frame 50 is connected a side of the column 4 by bolts 91 extending through apertures 502 in a flange of the frame 50 and engaged with holes 44 in the column 4. A pusher 52 includes a rod 522 perpendicularly extending therefrom and a guide rod 520 extends from the pusher 52. The guide rod 520 movably extends through a through hole 501 defined through the frame 50. A bolt 51 extends through a hole 503 in the frame 50 and contacts the guide rod 520 to adjust a distance of the pusher 52 and the frame 50. A pressing member 53 is movably mounted to the rod 522 which has two flat surfaces 523 defined in an outside thereof. The pressing member 53 includes a ring 531 for mounting on the rod 522, two pressing plates 530 extending radially outward from the ring 531. A bolt 90 extends through the ring 531 and contacting one of the flat surfaces 523. The object "A" is put on the base 6 and contacts an end 521 of the pusher 52, and the two pressing plates 530 press on the object "A".

Figure 3:
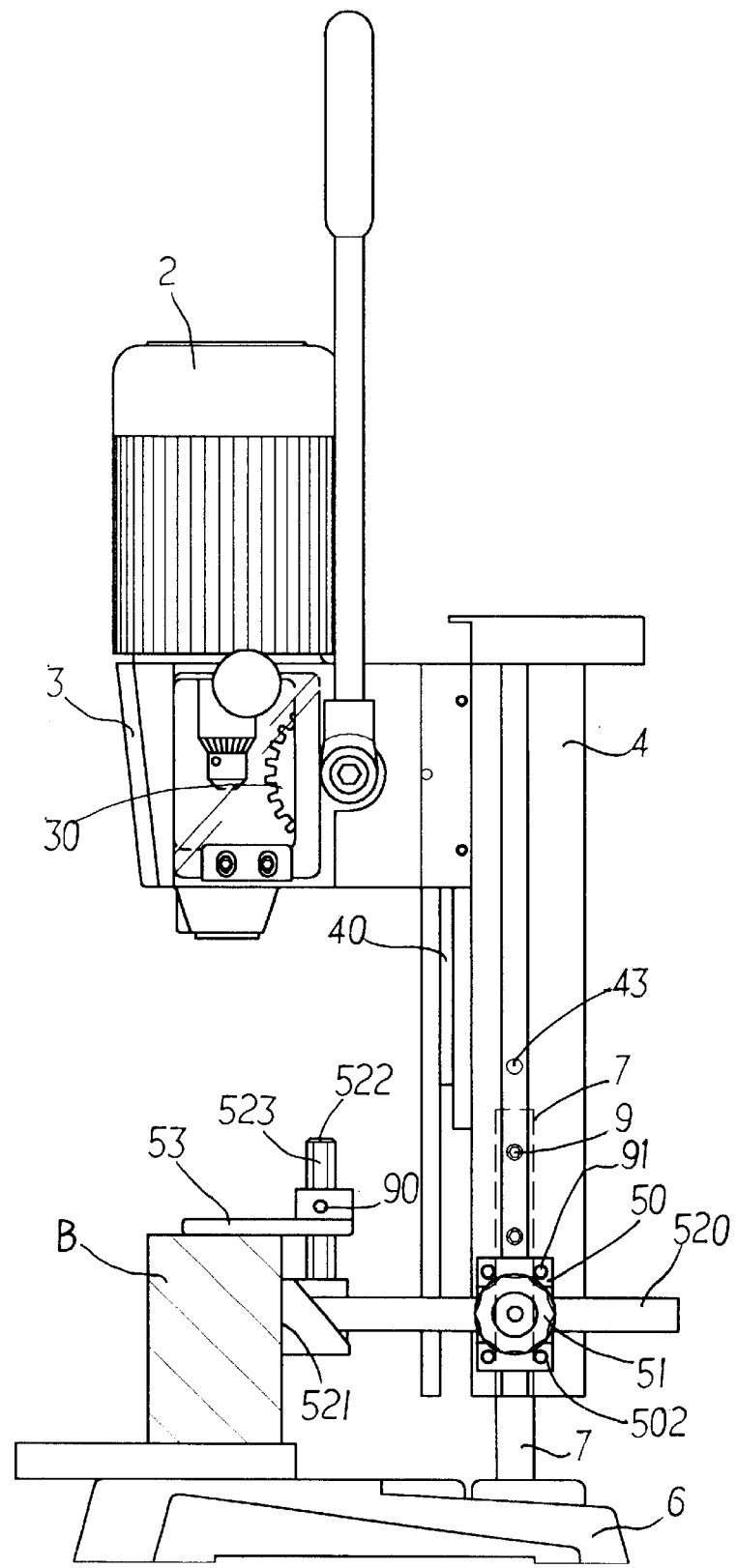
FIG. 3 is a side view to show another object is positioned between a pressing member and a base of the press drill.

As shown in FIG. 3, if another object "B", higher than the object "A", is to be drilled, the positioning bolt 9 is loosened and the column 4 is lifted to a desired height, and the positioning bolt 9 is then engaged with another second hole 70 so that the pressing member 53 is also raised.

Referring to FIGS. 4 and 6, when yet another object "C", higher than the object "B", is to be drilled, the column 4 is lifted to let the pin 8 disengaged from the positioning passage 42 and the column 4 is rotated 180 degrees about the post 7 until the pin 8 is engaged with the other positioning passage 42. The pusher 52 is then also rotated 180 degrees. Therefore, the object "C" can be put on a lower surface and pressed by the pressing plates 53.

Accordingly, during rotating the column 4, the operator is conveniently to position the column 4 by inserting the pin 8 in the other positioning passage 42 in the column 4. This will save a lot of time when adjusting the position of the column 4.

While we have shown and described various embodiments in accordance with the present invention, it should be clear to those skilled in the art that further embodiments may be made without departing from the scope and spirit of the present invention.

What is claimed is:

1. A column positioning device for a drill press, comprising:

a base having a post and a positioning pin respectively extending from a top of said base, a hollow column having a central passage and two positioning passages respectively defined longitudinally therethrough, said post received in said central passage and said positioning pin engaged one of said positioning passages, a motor movably connected to and along said column;

a frame connected a side of said column and a pusher connected to said frame, a rod extending from said pusher, and a pressing member movably mounted to said rod.

2. The device as claimed in claim 1 further comprising a plurality of first holes defined radially through said post and a plurality of second holes defined through a side of said column, a positioning bolt extending through one of said second holes and engaged with one of said second holes.

3. The device as claimed in claim 1, wherein said rod has two flat surfaces defined in an outside thereof said pressing member including a ring for mounting on said rod, two pressing plates extending radially outward from said ring, a bolt extending through said ring and contacting one of said flat surfaces.

4. The device as claimed in claim 1, wherein said frame has a through hole defined therethrough and a guide rod extends from said pusher, said guide rod movably extending through said through hole of said frame.

5. The device as claimed in claim 4 further comprising a bolt extending through said frame and contacting said guide rod.

* * * * *